Oct. 30, 1928.　　　　　F. O. NELSON　　　　　1,690,027

VALVE

Filed April 2, 1926

Frank O. Nelson
INVENTOR

BY Victor J. Evans
ATTORNEY

Patented Oct. 30, 1928.

1,690,027

UNITED STATES PATENT OFFICE.

FRANK O. NELSON, OF TEKOA, WASHINGTON.

VALVE.

Application filed April 2, 1926. Serial No. 99,338.

This invention relates to a valve, the general object of the invention being to so construct the valve that the use of packing means is unnecessary.

Another object of the invention is to thread the stem of the valve member into the bonnet so as to insure a perfect seating of the valve member on its seat.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
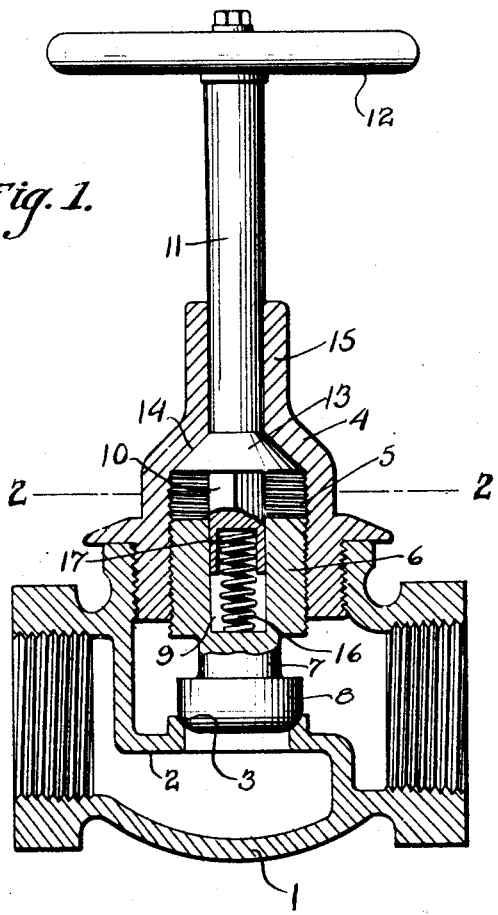
Figure 1 is a sectional view through the improved valve.
Figure 2:
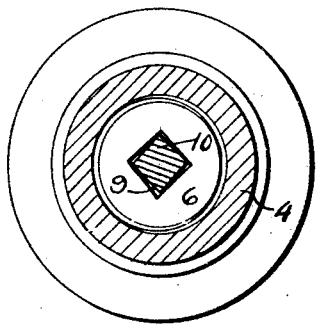
Figure 2 is a section on line 2—2 of Figure 1.
Figure 3:
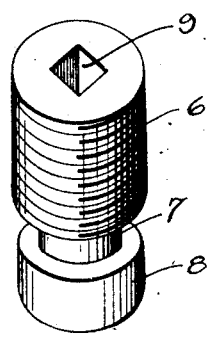
Figure 3 is a view of the valve member and its threaded stem.
Figure 4:
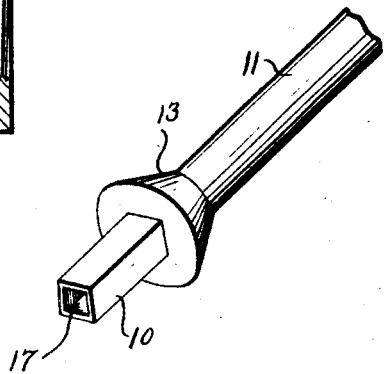
Figure 4 is a view of a portion of the stem of the handle.

In these views, 1 indicates the body of the valve, the partition 2 of which is formed with the seat 3. The bonnet 4 is threaded into the top of the body and said bonnet is provided with an internally threaded part 5 which is engaged by the externally threaded cylindrical part 6 of the valve member 7 which carries the valve 8 at its lower end. The part 6 is provided with a square central opening 9 which receives the square part 10 on the stem 11 of the handle 12 so that when the handle is turned, the member 7 will also be turned, and due to its threaded engagement with the bonnet, this turning movement of the member 7 will cause it to move vertically toward or away from its seat. The stem 11 is provided with a frusto-conical part 13 for engaging a similar part 14 of the bonnet, the outer end of the bonnet being of tubular shape, as shown at 15, for receiving a portion of the stem 11. A spring 16 is seated in the opening 9 and has its upper end engaging a socket 17 in the part 10 so that said spring tends to hold the part 13 against a part 14 of the bonnet, these parts being ground to make a fluid-tight joint.

From the foregoing, it will be seen that by having the parts 13 and 14 with the spring, a packing gland is rendered unnecessary, as these parts prevent the escape of liquid through the bonnet. By threading the member 7 in the bonnet, a proper seating of the valve 8 on its seat is insured and by removing the bonnet, the valve member 7 is removed therewith.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A valve of the class described comprising a body having a valve seat therein, a bonnet detachably connected with the body and having an internally threaded part and a reduced tubular upper part, a valve member having its lower end shaped to engage the seat with external threads on its upper part engaging the threads in the bonnet, a handle having its stem guided in the tubular upper part and passing into the bonnet, the inner end of the stem being of rectangular shape and the valve member having a similarly shaped socket for slidingly receiving said end, said end having a socket therein, a frusto-conical part on the stem and a similar shaped part in the bonnet engaged by the same and a spring in the valve member and engaging the socket in the inner end of the handle stem for holding the conical parts in engagement.

In testimony whereof I affix my signature.

FRANK O. NELSON.